(12) United States Patent
Phaltankar

(10) Patent No.: US 8,443,239 B2
(45) Date of Patent: May 14, 2013

(54) HIGH RESILIENCY NETWORK INFRASTRUCTURE

(75) Inventor: Kaustubh Phaltankar, Springfield, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 190 days.

(21) Appl. No.: 13/106,440

(22) Filed: May 12, 2011

(65) Prior Publication Data
US 2011/0214019 A1    Sep. 1, 2011

Related U.S. Application Data

(62) Division of application No. 12/263,913, filed on Nov. 3, 2008, now Pat. No. 7,961,634, which is a division of application No. 10/720,519, filed on Nov. 25, 2003, now Pat. No. 7,457,235, which is a division of application No. 09/219,413, filed on Dec. 23, 1998, now Pat. No. 6,714,549.

(51) Int. Cl.
G06F 11/00    (2006.01)
G06F 11/24    (2006.01)

(52) U.S. Cl.
USPC .................. 714/43; 714/32; 714/41; 370/248

(58) Field of Classification Search .................... 714/32, 714/33, 41, 43; 370/241, 248, 252
See application file for complete search history.

(56) References Cited

U.S. PATENT DOCUMENTS

| | | | |
|---|---|---|---|
| 5,473,599 A | 12/1995 | Li et al. | |
| 5,477,531 A | 12/1995 | McKee et al. | |
| 5,633,866 A | 5/1997 | Callon | |
| 5,805,805 A | * 9/1998 | Civanlar et al. | ................ 709/220 |
| 6,009,100 A | 12/1999 | Gausmann et al. | |
| 6,016,319 A | 1/2000 | Kshirsagar et al. | |

(Continued)

OTHER PUBLICATIONS

"UUNET Global Network" Jul. 7, 1998, 1 page, http://www.uu.net/lang.en/network/.*

(Continued)

*Primary Examiner* — Joseph Schell

(57) ABSTRACT

The invention provides a highly resilient network infrastructure that provides connectivity between a main network such as the Internet and a subnetwork such as a server-based (e.g., web server) local area network. In accordance with the invention, a network interface incorporated into a server hosting center provides a resilient architecture that achieves redundancy in each of three different layers of the Open System Interconnect (OSI) stack protocol (i.e., physical interface, data link, and network layers). For every network device that is active as a primary communication tool for a group of subnetworks, the same device is a backup for another group of subnetworks. Based on the same connection-oriented switching technology (e.g., asynchronous transfer mode (ATM)) found in high-speed, broadband Internet backbones such as that provided by InternetMCI, the network interface architecture provides a high degree of resiliency, reliability and scalability. In accordance with the invention, interface network routers which provide routing functionality and connectivity between the Internet backbone and the customer subnetworks are fully meshed with those deployed in the Internet backbone. Permanent virtual circuits (PVCs) providing a multitude of logical transmission paths between each hosting center router and every router in the Internet backbone, greatly reduces processing delays of data traffic through the infrastructure as only a single "hop" routing step is required between any external access point on the Internet backbone and a hosting center router.

27 Claims, 7 Drawing Sheets

U.S. PATENT DOCUMENTS

| | | | |
|---|---|---|---|
| 6,115,382 | A | 9/2000 | Abe |
| 6,167,025 | A | 12/2000 | Hsing et al. |
| 6,172,981 | B1 | 1/2001 | Cox et al. |
| 6,223,149 | B1* | 4/2001 | Margulis et al. ............... 703/27 |
| 6,229,787 | B1 | 5/2001 | Byrne |
| 6,304,549 | B1 | 10/2001 | Srinivasan et al. |
| 6,396,815 | B1 | 5/2002 | Greaves et al. |
| 6,442,141 | B1* | 8/2002 | Borella et al. ............... 370/248 |
| 6,490,245 | B2 | 12/2002 | Burns et al. |
| 6,496,479 | B1 | 12/2002 | Shionozaki |
| 6,515,967 | B1 | 2/2003 | Wei et al. |
| 6,574,197 | B1 | 6/2003 | Kanamaru et al. |
| 6,714,549 | B1 | 3/2004 | Phaltankar |
| 7,457,235 | B2 | 11/2008 | Phaltankar |
| 7,693,082 | B2* | 4/2010 | Wright ............... 370/246 |
| 7,961,634 | B2* | 6/2011 | Phaltankar ............... 370/247 |
| 2007/0253341 | A1* | 11/2007 | Atkinson et al. ............... 370/252 |

OTHER PUBLICATIONS

"UUNET's Backbone" Jul. 7, 1998, 2 pages, http://www.us.uu.net/products/access/ustrans/network.html.*

"Customer Leased-Line Connections" Jul. 7, 1998, 1 page http://www.us.uu.net/products/access/ustrans/pop.html.* http://www.uu.net/lang.en/network/; "UUNET Global Network"; Jul. 7, 1998; 1 page.

http://www.us.uu.net/products/access/ustrans.pop.html; "UUNET's Backbone"; Jul. 7, 1998; 2 pages.

http://www.us.uu.net/products/access/strans/pop.html; "Customer Leased-Line Connections"; Jul. 7, 1998; 1 page.

* cited by examiner

HIGH RESILIENCY NETWORK INFRASTRUCTURE

RELATED APPLICATIONS

This application is a divisional of U.S. patent application Ser. No. 12/263,913, filed Nov. 3, 2008, which is a divisional of U.S. patent application Ser. No. 10/720,519, filed Nov. 25, 2003, now U.S. Pat. No. 7,457,235, which is a divisional of U.S. patent application Ser. No. 09/219,413, filed Dec. 23, 1998, now U.S. Pat. No. 6,714,549, the contents of which are incorporated herein by reference.

BACKGROUND OF THE INVENTION

The invention relates to the field of communication networks. More specifically, the invention relates to improving resiliency, scalability, and efficiency in the infrastructure of a network.

The increased popularity of and reliance on the Internet has made the Internet the ultimate computer network. Millions of users around the world access the Internet for personal as well as business use daily. The Internet, however, is not really a specific network at all, but rather an amorphous mass of interconnected networks spanning the globe while utilizing the same Internet Protocol (IP) to pass information from one network to another. The networks making up the Internet are typically arranged in groups of computers connected together to allow information to be transmitted to one another. Such groups are referred to as "local area networks (LAN)." The LAN medium is "connectionless," i.e., users on the LAN exchange message information without building specific connections to one another. LANs can be connected together to form a larger network (referred to as a "wide area network (WAN)") that may have geographically spaced network members. LANs/WANs that are connected to the Internet are often referred to as "subnetworks" or "subnets" of the Internet.

Communication networks and their operations can be described according to the well-known Open Systems Interconnection (OSI) model (also referred to as the "OSI stack protocol") developed by the International Organization for Standardization (ISO). Each of seven layers (i.e., application, presentation, session, transport, network, data link, and physical interface) of the OSI model performs a specific data communications task that provides a service to and for the layer that precedes it (e.g., the network layer provides a service for the transport layer). The operation of the OSI model is often likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

The ISO has specifically defined all seven layers, which are summarized below in the order in which the data actually flows as it leaves its source:

Layer 7, the application layer, provides for a user application (such as getting money from an automatic bank teller machine) to interface with the OSI application layer. The OSI application layer has a corresponding peer layer in another open system, e.g., the bank's host computer.

Layer 6, the presentation layer, makes sure the user information (a request for $50 in cash to be debited from the user's checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is reliable.

Layer 3, the network layer, provides routing and relaying of data through the network (among other things, at layer 3, on the outbound side, the "envelope" will be labeled with an "address" which is read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which data moves across those physical connections from layer 1 at the source to layer 1 at the destination.

Information transported from network to network on the Internet is done through a system called "packet switching." All information that is sent or received over the Internet is broken down or disassembled into small portions (referred to as "packets") in accordance with a protocol known as "Transmission Control Protocol (TCP)." These packets are labeled with address information specifying the destination of each packet, together with an indication of the order in which the packets are to be reassembled at the intended destination. Internet "routers," which join one network to another along the transmission paths of the Internet, are used as path finding devices charged with interpreting the packet labels and determining the best transmission path for a particular packet to take on route to the ultimate destination. On its way to the ultimate destination, the packet will be processed by multiple routers at various points of the Internet. The addressing and routing of the packets conforms with a protocol known as "Internet Protocol (IP)." According to the IP, each node of the Internet is provided with a unique IP address having a specific length and format.

Each segment between routers is a point-to-point data transmission referred to as a "hop." Although one hop will typically include transmission over a communication line segment connecting one network to another, often a hop will cause a packet to be passed through one or more other network components such as repeaters, hubs, bridges, gateways and switches that are each used by a network to facilitate the transmission of the packets through the network. A repeater, for example, is used to amplify the packet data to extend the distance in which the packet can travel. Repeaters are often found in the dedicated broadband telecommunications connection known as a "backbone," such as the Internet backbone provided by MCI. (A backbone network (referred herein simply as "backbone") is a "transit" network often made up of long-distance telephone trunk lines and other wired and wireless links such as microwave and satellite links for use in transmitting large amounts of data simultaneously between host computer systems connected to the Internet. Normal communicated data typically neither originates nor terminates in a backbone network.) A hub is used to tie individual or groups of computers together, controlling the order in which the computers can transmit information to one another. Bridges link LANs together, allowing data designated for one LAN to pass through from one to another. Gateways work like bridges, but also translate data between one network type to another. A switch establishes a connection between disparate transmission path segments in a network (or between networks). A router, which is essentially an intelligent bridge, can be used to control the various path segments connected by a switch based on the destination information contained in the label of a given packet.

Once the transmitted packets arrive at the ultimate destination, the packets are reassembled in proper order by a local server and forwarded to one or more local computers. As with the computer system transmitting the original data packets, the local server is typically connected to the local computers (or terminals) using a direct LAN line, modem dial up, or other well-known connection. As used herein, any computer that is assigned an IP address and connected to the Internet is referred to as a "host." Generally, two types of hosts are present in a system: "server hosts," which provide services (e.g., web site, e-mail, file access, etc.) to remote computers and terminals; and "client hosts," which only access services on the Internet provided by server hosts.

Users whose computers and networks are not directly connected to the Internet typically gain access to the Internet through Internet Access Providers (IAPs), Internet Service Providers (ISPs), and Online Service Providers (OSPs) such as Internet MCI. The IAPB, ISPs, and OSPs will collectively be referred to herein as "Internet providers." Internet providers must utilize interface architecture to provide Internet connectivity to their customer users who desire a presence on the Internet. One such known interface architecture is shown in FIG. 4. As shown in dashed outline, hosting center 310 provides the hosting architecture needed to supply customer networks (i.e., "subnetworks" or "subnets") 28a with connectivity to the Internet (represented by Internet backbone 200).

Each customer subnet 28a represents, for example, a LAN (using an Ethernet transmission protocol) and web site server used to supply the content of the customer's web site as hosted by the Internet provider. Customer subnet routers 36a-36e provide connectivity between the customer subnetworks 28a and the hosting center 310. Information signals to be sent to the Internet from web site servers in the customer subnets 28a are received by the customer subnet routers 36a-36e and converted into the appropriate packets in accordance with the well-known TCP/IP standards required for Internet transmission. The customer subnet routers 36a-36e determine the best path through one of the dual-ring fiber distributed data interface (FDDI) fiber optic networks 34a, 34b (reaching access speeds of 100 Mbs (simplex) per ring) and one of the border routers 32a, 32b. For each data packet routed to border router 32a, border router 32a determines which one of two data service level 3 (DS-3) communication links (30a, 30b), which provide simplex data rates as high as 44.736 Mbps, is the best route to select in order to forward the data packet on its way towards its addressed destination. Similarly, border router 32b determines which one of DS-3 links 30c, 30d is to be selected for data packets border router 32b receives from FDDIs 34a, 34b.

As the world population increases its computer literacy, the ability to exchange ideas, expressions and discoveries hinges upon the ability of computers and computer systems to interconnect with one another. The recent explosion in usage of the Internet, particularly, the world wide web, as well as the increase in complex, processor-intensive applications intended for use on the Internet, has placed unprecedented demand on computer systems to increase in reliability, capacity and speed. The known interface architecture shown in FIG. 4, for example, was limited to 180 Mbs simplex communications between the border routers 32a, 32b and the Internet backbone 200, and to 200 Mbs around the FDDI networks 34a, 34b. In addition, the architecture is based on two shared physical link protocols: Ethernet and FDDI. As a result, computers and terminals on the Ethernet LAN and routers on the FDDI share a single physical link having a fixed bandwidth. The disadvantage of such protocols is that the addition of more stations on the link reduces the average bandwidth available to each station on the link. Adding customer subnets and routers to satisfy increase in usage, therefore, only adds to the bottlenecks created by the insufficient scalability (i.e., ability to provide adequate solutions with increase in size) of the interface architecture in the hosting center 310.

In addition, the single communication link connecting customer subnet routers 36c and 36d, and the single link between router 36d and 36e presents many single points of failure for customers attached to routers 36d and 36e. The failure along the transmission path between customer subnet routers 36c and 36e would be catastrophic for at least some of these customers. Moreover, because the Ethernet segments connecting the components in the interface architecture must be bridged together in a loop-free topology, redundant paths cannot be created between bridged Ethernet segments. As a result, additional single points of failure of any one of these components in the hosting center 310 would require human intervention to reconfigure the remaining components to bypass the failed component. The lack of resiliency inherent in this architecture contributed to Internet blackouts and slowdowns that occurred often and added delay for data packets to reach their destinations to and from the hosting center.

SUMMARY OF THE INVENTION

The invention provides a highly resilient network infrastructure that provides connectivity between a main network such as the Internet and a subnetwork such as a server-based (e.g., web server) local area network. In accordance with the invention, a network interface incorporated into a server hosting center provides a resilient architecture that achieves redundancy in each of three different layers of the Open System Interconnect (OSI) stack protocol (i.e., physical interface, data link, and network layers). For every network device that is active as a primary communication tool for a group of subnetworks, the same device is a backup for another group of subnetworks. Based on the same connection-oriented switching technology (e.g., asynchronous transfer mode (ATM)) found in high-speed, broadband Internet backbones such as that provided by InternetMCI, the network interface architecture provides a high degree of resiliency, reliability and scalability.

In accordance with the invention, interface network routers which provide routing functionality and connectivity between the Internet backbone and the customer subnetworks are fully meshed with those deployed in the Internet backbone. Permanent virtual circuits (PVCs) providing a multitude of logical transmission paths between each hosting center router and every router in the Internet backbone, greatly reduces processing delays of data traffic through the infrastructure as only a single "hop" routing step is required between any external access point on the Internet backbone and a hosting center router.

BRIEF DESCRIPTION OF THE DRAWINGS

FIG. 1b illustrates the data link layer of a network architecture in accordance with the preferred embodiment of the invention shown in FIG. 1a;

FIG. 1c illustrates the network layer of a network architecture in accordance with the preferred embodiment of the invention shown in FIG. 1a;

DETAILED DESCRIPTION OF PREFERRED EMBODIMENTS

The invention will be described in detail with reference to the preferred embodiments illustrated in FIGS. 1a, 1b, 1c, 2a, 2b, and 3. The invention is described herein in its preferred application to a hosting network infrastructure that provides hosting services to customer subnetworks to allow the subnetworks to transfer information to and from an Internet backbone network. However, the invention may be applicable to any type or configuration of communications network that provides connectivity between a subnetwork and a main network.

Figure 1A:
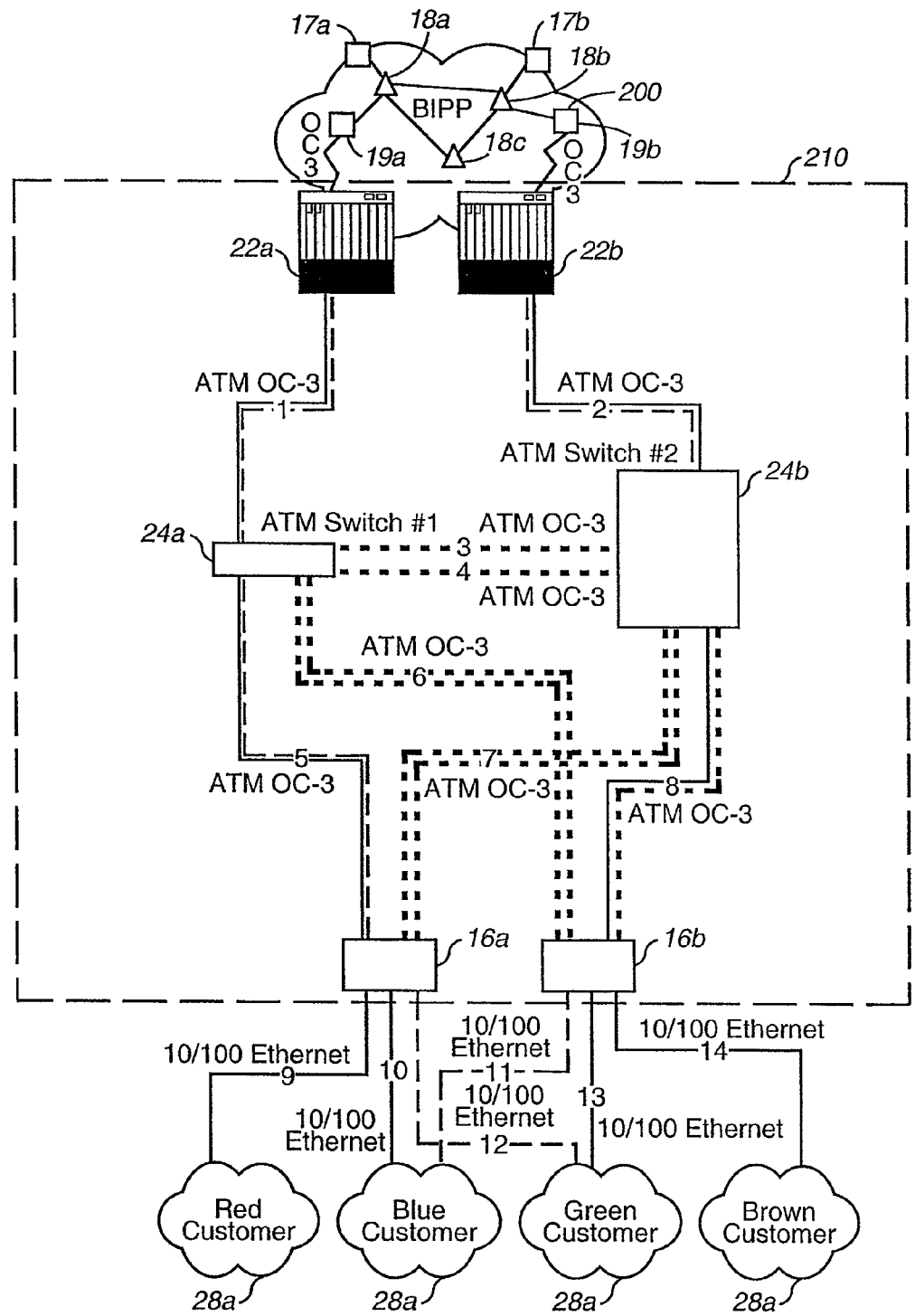
FIG. 1a illustrates the physical interface layer of a network architecture in accordance with a preferred embodiment of the invention.

As shown in FIG. 1a, in accordance with a preferred embodiment of the invention, a hosting center 210 provides a highly resilient, redundant, and scaleable infrastructure supplying connectivity between a customer (via customer subnetwork 28a) and the Internet (via Internet backbone 200). In the preferred embodiment, the customer subnetworks 28a may be LANs having local servers for one or more of a variety of applications, including web server, POP3 mail server, ftp server, audio/video server (for streaming or other audio/video feeds), intranet/extranet server, or any other application server known in the art.

Because of the prevalent use of Ethernet protocol throughout the art, customer subnetworks 28a are shown in their preferred embodiments as being connected to the hosting center 210 using 10 Base-T or 100 Base-T Ethernet communication links 9, 10, 13, 14. Any other known networking or other signaling transmission protocol may be utilized, however. These communication links are received on input ports of known edge devices. In the preferred embodiment, such edge devices, as catalyst switches 16a, 16b, are used and are preferably off-the-shelf versions of the commercially available Catalyst 5000 Multilayer Switching Systems series made by Cisco Systems, Inc. such as the Catalyst 5500 (or any equivalent switching system consistent with the functions described herein). Catalyst switches 16a, 16b facilitate migration of the Ethernet LAN used by the customer subnetworks 28a to an asynchronous transfer mode (ATM)-based switched network that is at the core of the hosting center architecture 210.

ATM switching technology makes it possible to convert all types (e.g., Ethernet, Token Ring, etc.) of information to the same fixed information (referred to as a "cell"), and to transmit the fixed information at high speeds, irrespective of whether the information is continuous information such as streaming audio/video, or burst information such as data, and irrespective of the underlying data rates of the information. The ATM cell has a fixed length of 53 bytes, partitioned into a 5-byte header and a 48-byte information field (also known as "the payload"). One of the functions of the cell header is to assist in routing the ATM cell from one point in the network to another through one or more switching nodes. In particular, the header is essential in the process of identification of a virtual connection. The terms "virtual connection" and "virtual circuit" as used herein are defined to mean a communication channel that may include one or more interconnected virtual connection segments. Each "virtual connection segment" is a data channel or control channel that traverses one link between two neighboring nodes or one link between a host and node, while a connection or virtual connection (VC) is a communication channel that travels through numerous links and their connecting nodes. A "connection" is established or represented by a set of one or more virtual connection identifiers (VCIs) stored in the VC tables of the nodes along the connection path.

The routing information within the ATM cell is contained within two fields: a virtual path identifier (VPI) identifying the virtual path designated for the particular ATM cell; and a virtual channel identifier (VCI) identifying the virtual channel in the virtual path designated for the ATM cell. Based on the VPI/VCI information in the header, a cell is routed from an input port of the switch to the appropriate output port and onward along the designated path to the next network module (typically, another ATM switch). During a typical operation (e.g., placement of a telephone call) of an ATM-switched network, a process known as "call setup" is performed. This call setup process involves a determination of the best path through the network for transmission of cells carrying voice/data information for the call. Once this path is selected, all of the ATM switches located along the selected path are updated to allocate input/output ports (identified by VPI/VCI data) to correspond to the selected path. When the call is in progress and cells carrying voice/data information for the call are transmitted through the network, the VPI/VCI header information contained in the cells will cause each such ATM switch along the selected path to make the appropriate connections consistent with the virtual path selected during call setup. After the call is completed, a process known as "call tear down" will update the ATM switches to remove the selected virtual path in order for a new call setup process to utilize one or more of the ATM transmission segments previously allocated to the selected path in making a new path selection.

ATM is relied upon in the invention because it facilitates transmission of data packets on a broadband network such as the Internet backbone, as it transmits its cells asynchronously between sending and receiving stations without the need for synchronization, and can be processed by switching, routing, and other basic network components quickly.

The catalyst switches 16a, 16b operate in a LAN Emulation (LANE) protocol to transparently run each customer's subnetwork Ethernet LAN applications over the ATM switched network of the invention. The LANE protocol is a layer 2 (i.e., "data link layer" of the OSI standard stack) bridging protocol that causes the ATM-based interface architecture making up the remainder of the resilient interface infrastructure (described in detail below) of hosting center 210 to appear to higher-layer (i.e., layers 3-7) protocols and applications as a connectionless Ethernet LAN segment. The catalyst switches 16a, 16b thus permit customers employing Ethernet (or Token Ring) LANs in their subnetworks 28a to reap the advantages of an ATM-based network architecture without obviating their investments in older LAN hardware, software, and other various network components.

Each customer subnetwork 28a will be assigned its own data link layer broadcast domain having a single IP subnet. To create single broadcast domains for each customer, virtual LANs (VLANs) are used on the catalyst switches 16a, 16b in well-known fashion. By creating individual broadcast domains, multiple VLANs may be run over one physical connection. The ATM devices in the hosting center utilize LANE to provide trunk connections between ATM switches 24a, 24b and routers 22a, 22b. LANE allows the consolidation of multiple customers onto one physical router interface by creating separate Emulated LANs (ELANs) for each customer. This results in creation of a one-to-one correspondence between customers, broadcast domains, VLANs, ELANs, and IP subnets.

In its implementation, the LANE services are provided by three software modules: LAN Emulation Configuration Server (LECS); LAN Emulation Server (LES); and the Broadcast and Unknown Server (BUS). One LECS will be designated for controlling operation of the LANE services for the entire ATM network, while a LES/BUS pair will be assigned for each ELAN configured in the hosting center. All three modules, however, are preferably stored in multiple places and maintained in "hot-standby" for redundancy purposes. A protocol known as the "simple server redundancy protocol (SSRP)" by Cisco Systems is employed by the catalyst switches 16a, 16b to control the use of the redundant LANE services modules.

Figure 1B:
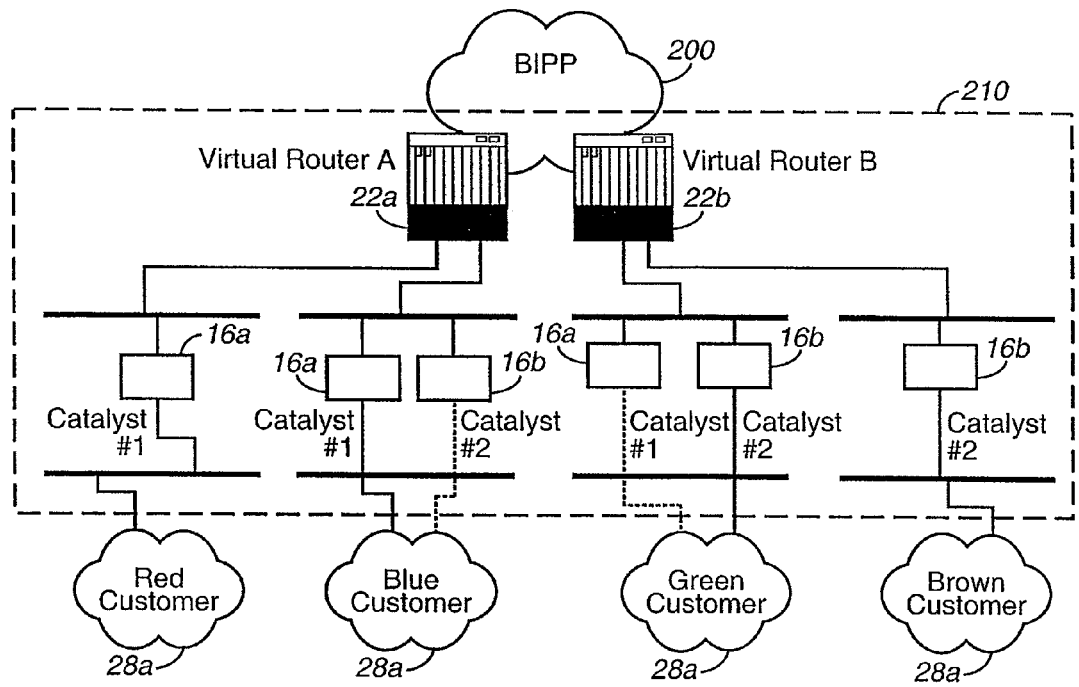

For customers who require additional security, catalyst switches 16a, 16b may both be connected to an individual customer through mutually redundant connections, as shown by redundant communication links 11 and 12 respectively connected to Blue and Green customer subnetworks 28a in FIG. 1a. Catalyst switches 16a, 16b connected in this fashion perform a "Spanning Tree Protocol" that is used to eliminate the catalyst switch as a single point of failure. As is well known in the art, the Spanning Tree Protocol allows the creation of redundant paths between Ethernet segments by creating a loop-free topology for a given broadcast domain. In particular, all bridges within the broadcast domain exchange topology information using the Spanning Tree Protocol. Based on this information, certain bridge ports are then put into a "blocking" mode. These ports essentially become "hot-standby" connections (i.e., physical connections identified but not active until a failure along the "primary" path occurs). FIG. 1b illustrates the connections between the customer subnets 28a and the catalyst switches 16a, 16b as viewed from the OSI data link layer 2 level.

As a result of the Spanning Tree Protocol, in this example, communication links 10 and 13 are designated as the "primary" connections to the Blue and Green customer subnetworks, respectively, as shown by the solid lines connecting the customer subnets to the catalyst switches 16a, 16b in FIGS. 1a, 1b. The connections formed by communication links 11 and 12 are "blocked," i.e., connections are otherwise available for transporting data signals, but remain inactive, as shown by the dashed lines in FIGS. 1a, 1b. If, however, the "primary" catalyst switch 16a or 16b fails or otherwise loses connectivity with the customer subnet, the other catalyst switch will begin converting and forwarding data packets for that customer network 28a in lieu of the failed catalyst switch.

Assuming that both catalyst switches 16a, 16b are functional, the catalyst switches are respectively coupled to ATM switches 24a, 24b (FIG. 1a) through communication links 5 and 8, which in this exemplary embodiment are ATM optical connection level 3 (OC-3) fiber optic links having signaling rates of approximately 155 Mbps. Any other known transmission links may also be used such as T1, OC-12, OC-192, etc. In the preferred embodiment, ATM switches 24a, 24b may be off-the-shelf versions of the commercially available ForeRunner™ series of ATM backbone switches made by FORE Systems such as the ASX-200BX or ASX-1000 ATM switches or other known functionally equivalent equipment. ATM switches 24a, 24b selectively establish connections between ATM communication links 5, 8 and ATM communication links 1, 2, respectively.

In the preferred embodiment, additional redundant communication links (ATM OC-3) 6 and 7 are respectively provided to connect catalyst switch 16a with ATM switch 24b, and to connect catalyst switch 16b with ATM switch 24a, thereby making ATM switches 24a, 24b mutually redundant. In the event, for example, catalyst switch 16a detects a failure of ATM switch 24a, or otherwise detects a loss of connectivity through communication link 5, catalyst switch 16a will remove link 5 as its primary communication link with the ATM architecture and designate communication link 7 as its new primary link. Similarly, catalyst switch 16b, upon detecting that ATM switch 24b or original primary communication link 8 has failed, will begin relying on communication link 6 as its primary network link.

ATM switches 24a and 24b receive, in the ATM cell format, the transmitted data packets from catalyst switches 16a, 16b. Based on the VPI/VCI data in the cell headers of the packets received data, ATM switches 24a, 24b will establish connectivity to the appropriate one of ATM OC-3 communication links 1, 2. As shown by dashed communication links 3, 4, ATM switches 24a, 24b are redundantly connected to one another to maintain some lines of connectivity in the event one of the ATM switches 24a, 24b fails (as will be discussed in detail below with respect to routers 22a, 22b). For example, in the event that link 1 fails, any traffic input through communication link 5 (or backup link 6) is re-routed through link 3 to ATM switch 24b. Similarly, failure of ATM switch 24b will cause traffic input to ATM switch 24b via link 8 will be rerouted to ATM switch 24a through link 6.

At the receiving end of communication links 1, 2 (FIG. 1a) are interface routers 22a, 22b, respectively, which are themselves connected to Internet backbone 200 via OC-3 links 20a, 20b, respectively. Preferably, interface routers are off-the-shelf versions of the 7500 Advanced Router System series of routers by Cisco Systems such as the Cisco 7513 router. Interface routers 22a, 22b determine, for each ATM cell received, the best transmission path from the hosting center 210 to an external access point (e.g., border routers 17a, 17b) connecting the Internet backbone 200 with an external network. For example, the external network may be another Internet backbone (e.g., Sprint backbone), a host computer, an intranet LAN, or any other known network, device or apparatus connected to one of the border routers 17a, 17b that is intended to receive Internet traffic. In the preferred embodiment, a "shortest exit" protocol is employed throughout the infrastructure in attempting to select the path that provides the shortest, fastest, and least congested transmission path to the ultimate destination (e.g., external access point) that may be available at the time of transmission. In particular, within the hosting architecture 210, the well-known "enhanced interior gateway redundancy protocol (EIGRP)" is performed to select the "shortest exit" path from a given one of customer subnets 28a through one of the possible communication links (e.g., one of two OC-3 links 1, 2) to Internet backbone 200. A similar protocol known as the "border gateway protocol (BGP)" is performed in the Internet backbone 200 when determining which one of the possible communication links between the Internet backbone 200 and hosting center 210 is to be selected based on a given external entry point to the Internet backbone 200 (e.g., one of external access points 17a, 17b). As should be readily apparent, however, any other suitable protocol used in the art may be applicable.

Figure 1C:
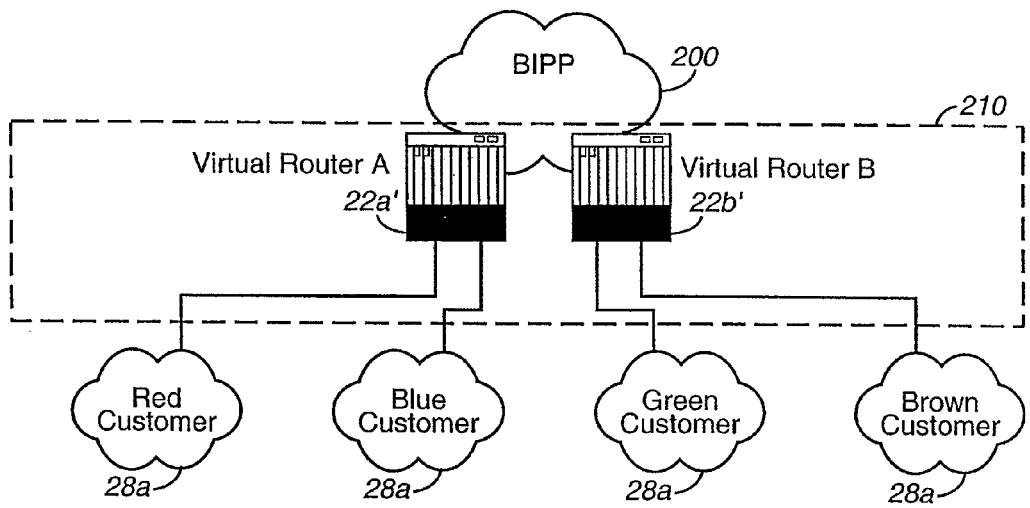

Although interface router 22a is shown physically connected to only one of the ATM switches (i.e., switch 24a) through a single communication line 1, a layer 3 routing redundancy is provided in the event router 22a or line 1 should fail. Both routers 22a, 22b employ a protocol known as "hot standby routing protocol (HSRP)," which allows router 22b to monitor the activity of router 22a and take over its responsibilities in the event router 22a or link 1 fails. (Router 22a performs the same redundancy service for router 22b using HSRP.) The two routers 22a, 22b are thus considered mutually redundant. In operation, HSRP creates a "virtual default gateway" by sharing a single IP address between routers 22a, 22b. As viewed by certain ones of customer subnets 28a (e.g., Red and Blue customer subnets), router 22a is designated as an "active" router, while router 22b is designated as the "standby" router. In this example, the Red and Blue customer subnets 28a store the single IP address mutually assigned to routers 22a, 22b as its "default router." Because HSRP allows both routers 22a, 22b to share the same IP address, there is no need to reconfigure the Red and Blue customer subnets 28a in the event router 22b must take over as the "active" router. For other customer subnets 28a (e.g., Green and Brown customer subnets), router 22b is designated as the "active" router, while router 22a is the "standby" router. Thus, on the network layer 3 level, the shared IP address makes routers 22a, 22b appear as a single virtual router 22a', as shown in FIG. 1c. A different shared IP address designated for use by other customer subnets (e.g., Green and Brown customer subnets 28a), make routers 22a, 22b appear on the network layer 3 level as virtual router 22b'.

In accordance with the invention, a "one hop" routing protocol is provided to significantly eliminate most of the delay inherent in conventionally routing the transmitted data packets from the customer's subnetwork through the Internet backbone 200. Interface routers 22a, 22b and ATM switches 24a, 24b employed in the network architecture of the invention are "fully meshed" (i.e., in a state of complete connectivity) with all the routers (e.g., 17a, 17b, 19a, 19b) and all the ATM switches (e.g., 18a, 18b, 18c) in the Internet backbone 200. Thus, in accordance with the invention, interface routers 22a, 22b are each fully connected to each and every router in the Internet backbone 200. This complete connectivity is provided through preassigned logical transmission paths (known as "permanent virtual circuits (PVCs)") utilizing various transmission segments along a route connecting each interface router 22a, 22b in hosting center 210 to each router in the Internet backbone 220.

The PVCs are composed of one or more ATM transmission path segments (e.g., communication lines between switches, routers, or other nodes in the network) whose connections through ATM switches are preassigned during configuration of the infrastructure. Instead of allocating the switch connections during a "call setup" process, as discussed above, the switch connections provided through the ATM switches are fixed permanently (at least until all or part of the infrastructure is reconfigured).

Because, in accordance with the invention, each router in the hosting center 210, as well as in the Internet backbone 200, stores a record of the paths formed by the preassigned PVCs in the network, the most appropriate logical transmission path from one interface router 22a, 22b to a router on an external access point (e.g., 17a, 17b) of the Internet backbone 200 can be selected and the data packet transferred in "one hop" with only a single routing process being performed. As should be readily apparent, the routing of data packets in the routers of the network is a layer 3 (OSI) process. Although only a single routing step is necessary, the transmission of the data packet (a physical layer 1 process) may require transfer through a number of different ATM switches and transmission links between the interface routers 22a, 22b and the border routers 17a, 17b.

Figure 2A:
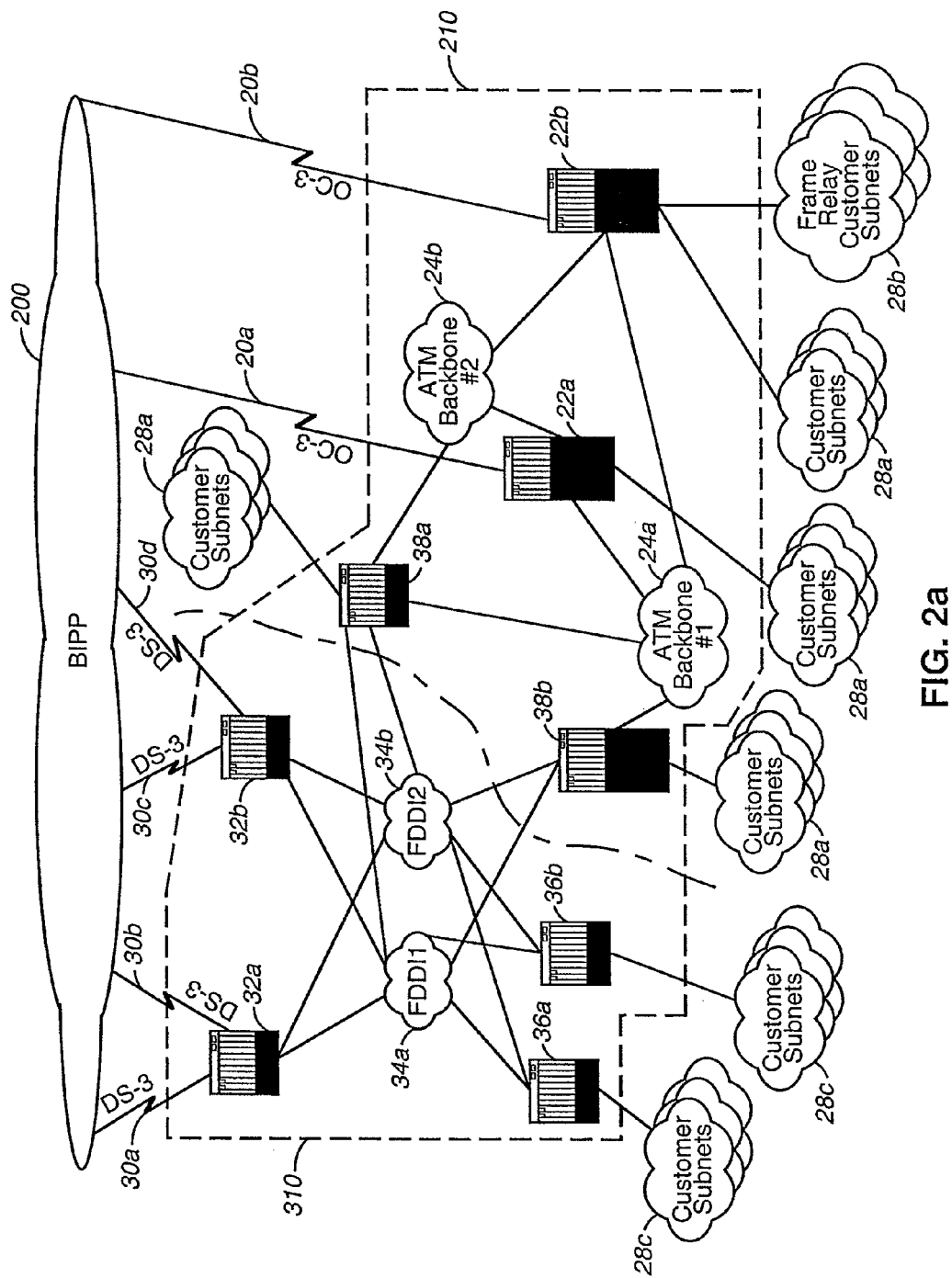
FIGS. 2a and 2b illustrate a network architecture in accordance with further preferred embodiments of the invention connecting peripheral customer subnetworks to the Internet backbone.
Figure 2B:
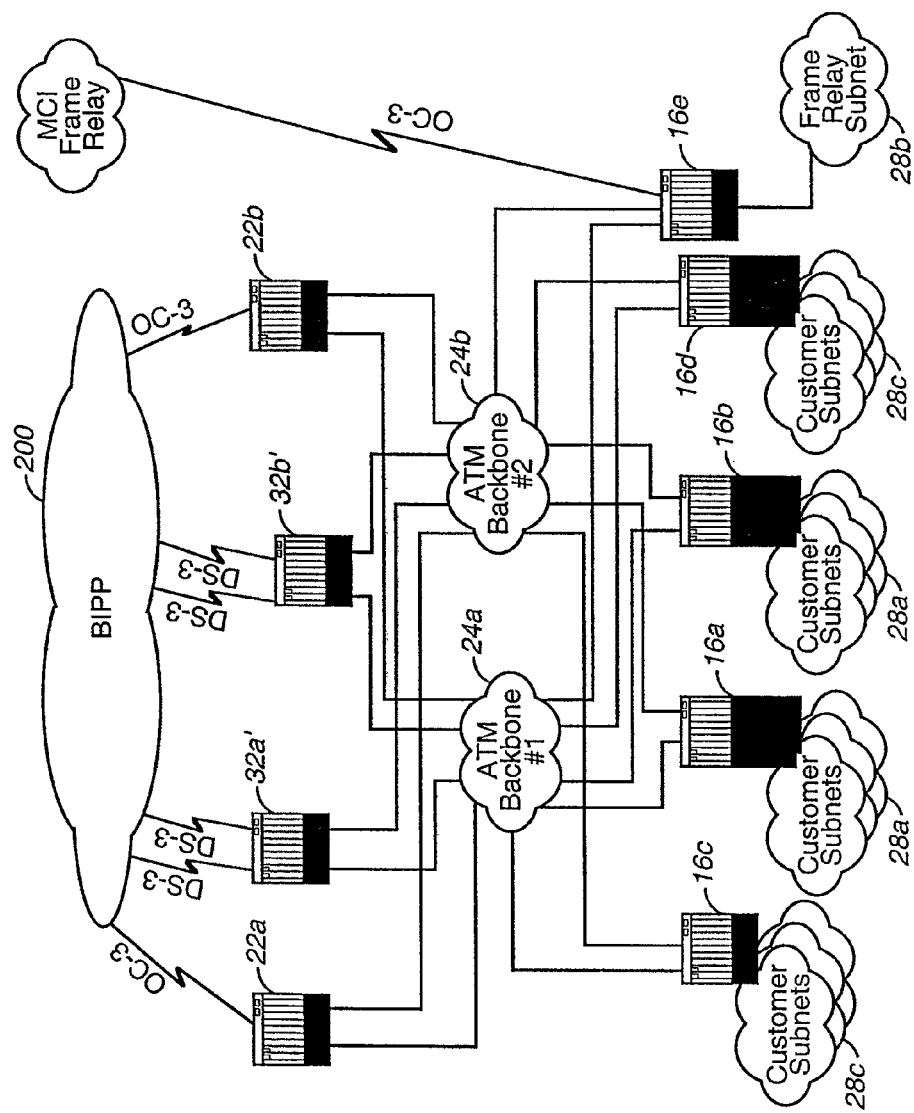

In accordance with another preferred embodiment of the invention, the hosting center architecture described above may be deployed in conjunction with existing hosting architecture, whether or not the existing architecture is ATM-based. Often an Internet provider who has invested considerable capital and other resources in installing and maintaining its existing hosting architecture may be reluctant to perform a complete tear down and replacement with the ATM-based architecture described above; instead, opting for a transition period in which both the original and new architecture could be utilized simultaneously. In accordance with this embodiment of the invention, the hosting center 210 can be extended to incorporate the existing architecture 310, as shown in FIG. 2a.

In the case where the existing architecture 310 is based on a "connectionless" technology such as FDDI and the new architecture 210 is based on a "connection-oriented" technology such as ATM, extension or gateway-type routers 38a, 38b must be provided to ensure the proper transmission of data packets between the different data link layer protocols. These gateway-type routers 38a, 38b may also be implemented by the 7500 Advanced Router System series of routers by Cisco Systems such as the Cisco 7507 or Cisco 7513 routers. The amount of traffic that will be transferred between hosting centers 210 and 310 is preferably held to a minimum by restricting the types of services offered by customer subnets 28c to those that can be hosted on the FDDI architecture 310. As noted previously, FDDI architecture 310 lacked adequate reliability, scalability and processing speed to support the increasing population of web servers and other bandwidth intensive application servers. The FDDI architecture 310, however, may be suitable for Net News servers, Mail servers, or other servers whose population increase is slower and whose traffic can be more easily supported by the bandwidth limited FDDI shared network and DS-3 connections to the Internet backbone 200. Hosting services for customer subnets 28a, 28b having web servers, intranet servers, and other customer application servers which require high reliability, resiliency, scalability and minimal delay is better served by the ATM-based architecture 210. (FIG. 2a illustrates another embodiment of the invention that permits interface routers 22a, 22b to perform the customer subnet router functions of catalyst switches 16a, 16b, as well as its normal border routing functions. Such an implementation, of course, may require additional processing power to achieve the desired results.)

In a further embodiment of the invention (shown in FIG. 2b), the FDDI architecture 310 can be completely replaced by reconfiguring the border routers 32a, 32b (FIG. 2a) into interface routers 32a', 32b' (FIG. 2b) connected to ATM switches 24a, 24b. As such, reconfigured interface routers 32a', 32b' provide "one hop" routing over the four DS-3 communication links connecting the hosting center 210 to the Internet backbone 200. Customer routers 36a, 36b (FIG. 2a) can be replaced by catalyst switches 16c, 16d (FIG. 2b) used to convert the format/protocol of the traffic generated by (or for) Net News (or other like) server-based customer subnetworks 28*c* into (from) the traffic format/protocol used in the ATM switched architecture in the hosting center 210. Frame relay router 16*e*, which may be an off-the-shelf version of the commercially available 7500 Advanced Router System series of routers by Cisco Systems such as the Cisco 7513 router, can also be added to provide support for an independent OC-3 connection to a frame relay-based private network such as those commercially available from MCI. Such private networks are often required of frame relay customer subnets 28*b* that desire more secure intranet, extranet, or other large wide area network services.

Prior to going "on-line" with any new network infrastructure, various tests of the new network must be performed to ensure workability, connectivity, reliability, etc. In accordance with another preferred embodiment of the invention, a test environment may be created in order to verify deployment of a network infrastructure such as that depicted in FIG. 1*a*. In accordance with this embodiment, the production components (e.g., Catalyst 5500 switch, Cisco 7513 router, etc.) that will be used in the final version of the hosting center network infrastructure should be used in testing the viability of the network design and configuration. However, in practice, new network infrastructure designs are typically deployed using (at least in part) existing hardware and software. In such cases, it is not practical to "take down" the existing network in order to determine if the planned new infrastructure will successfully replace the existing network. For this reason, functionally equivalent components may suffice to simulate the components that will ultimately be used in the production implementation of the planned network.

Figure 3:
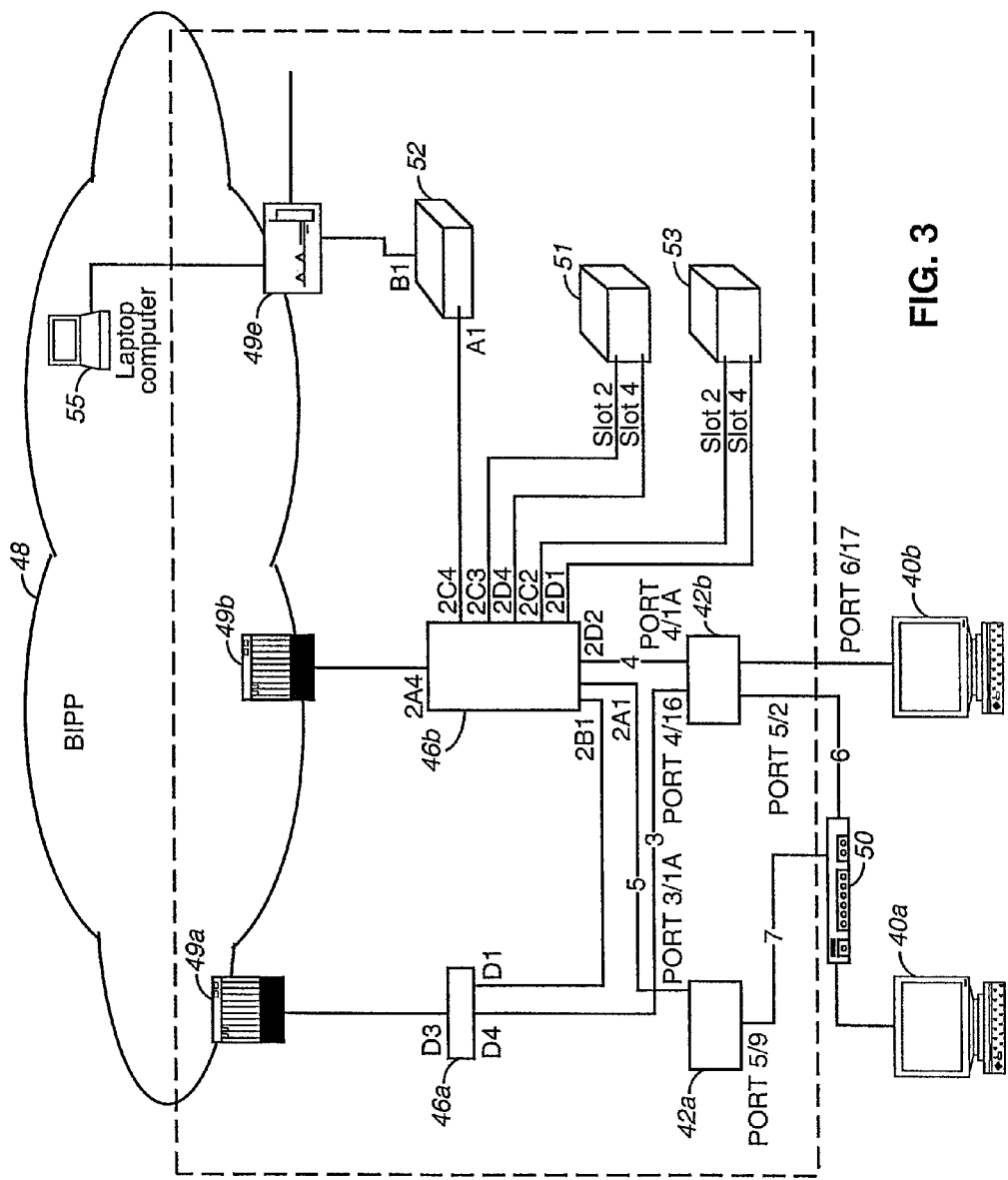
FIG. 3 illustrates the test environment in accordance with a preferred embodiment of the invention.
Figure 4:
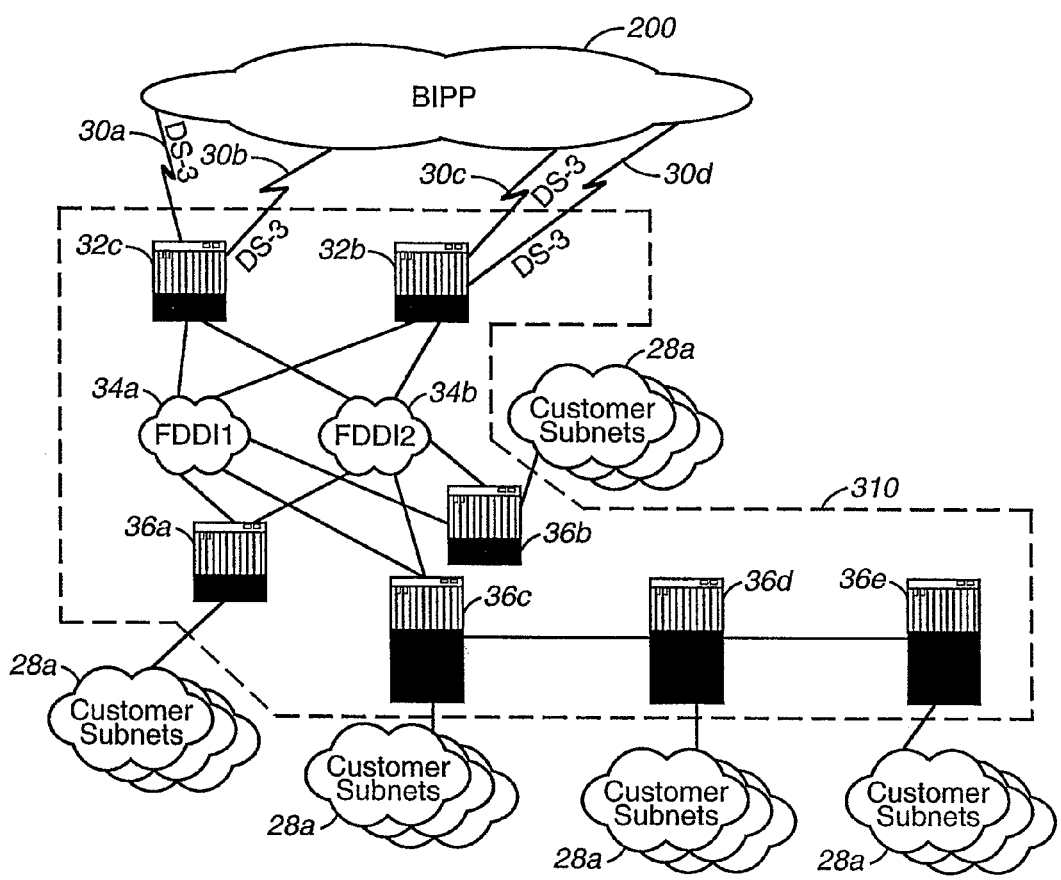
FIG. 4 illustrates a known network architecture for connecting customer subnetworks to an Internet backbone.

For illustration purposes, therefore, the deployment of the test architecture shown in FIG. 3 is made to approximate the preferred components used in the network infrastructure illustrated in FIG. 1*a*. For example, the test architecture utilizes as part of hosting center 43 two ATM switches 46*a*, 46*b* represented by a FORE Systems LE155 and a FORE Systems ASX1000, respectively. Catalyst switches 42*a*, 42*b* are represented by two Cisco Catalyst 5500 switches with ATM LANE interface modules. Border or interface routers 49*a*, 49*b* are represented by two Cisco 7507 routers. (The routers 49*a*, 49*b* need not be identical in configuration. In this example, router 49*a* contains one ATM interface processor (AIP), while router 49*b* contains one versatile interface processor (VIP) with ATM-Lite port adapter.) To simulate client requests from the Internet backbone, a third interface router 49*c* is provided to emulate the functionality of a border router using a Cisco Advanced Gateway Server Plus (AGS+) router. In this preferred embodiment, all three interface routers 49*a*, 49*b*, 49*c* communicate through EIGRP. (As with the other commercial components enumerated herein, it should be well understood that the above stated manufacturers and part numbers can easily be replaced by others that will provide equivalent services and functionality within the test environment.)

In this embodiment, the fully meshed ATM PVCs of the hosting center (used in the embodiment of FIG. 1*a*) can be emulated using a single ATM emulated local area network (ELAN) running LAN Emulation (LANE) protocol. The LANE services protocol software used may be run on catalyst switches 42*a*, 42*b*, on ATM switches 46*a*, 46*b*, on routers 49*a*-49*c*, or even on dedicated processing units such as the two FORE ASN 9000 nodes 51, 53 shown in FIG. 3. The LANE services must be provided in a redundant capacity. Any one of a number of known technologies may be used to provide the LANE services in this manner. The "Simple Server Redundancy Protocol (SSRP)" provided by Cisco Systems or the "Distributed LAN Emulation (DLE)" by Fore Systems are typical examples of such technologies. Using SSRP, one active LES/BUS pair per ELAN is maintained while other LES/BUSs for the same ELAN are in a backup state. The SSRP maintains a virtual connection (VC) to each LES/BUS, therefore, Cisco's LAN Emulation Clients (LECS) implementation is able to determine which LES/BUSs are functioning and, as a result, directs all LECs to the functioning LES/BUS in the order of highest priority. Using DLE, multiple active LES/BUS pairs for a single ELAN can be maintained. LECs will be connected to the "closest" LES/BUS. The multiple LES/BUS pairs share traffic by maintaining several point to multi-point VCs between each other. In the event of a LES/BUS failure, any LECs attached to that LES/BUS will rejoin the ELAN and be connected to the "closest" functioning LES/BUS.

Laptop 55 emulates a client connecting to the customer servers from the Internet. It is shown interfaced with border router 49*c*. To simulate a multiple customer load environment, a number (e.g., thirty three) of ELANS can be established. Routers 49*a*, 49*b* and catalyst switch 42*a* can be configured to be LAN Emulation clients on all the ELANS, although the exact location of the software is not critical.

To emulate customer server connections, one or more workstations can be connected to one or both catalyst switches 42*a*, 42*b*. In this example, two Sun Microsystems SPARC Ultra 1 units 40*a*, 40*b* are provided. In particular, in order to emulate a dual connected customer server, SPARC station 40*a* is shown attached to both catalyst switches 42*a*, 42*b* through a 10 Mb ethernet hub 50. In order to emulate a single connection, SPARC station 40*b* is attached directly to catalyst switch 42*a*. It should be understood that any processor-based system may be substituted for the aforementioned SPARC stations for purposes of emulating a customer connection.

In the preferred embodiment, the LANE services were run on catalyst switches 42*a*, 42*b*. LANE services run on the catalyst switches 42*a*, 42*b* may make use of the fault tolerance and redundancy offered by the dual-PHY ATM LANE module found within each catalyst switch 42*a*, 42*b*, which provides an extra measure of security in the infrastructure. This extra security, however, often requires that the ATM Network Service Access Point (NSAP) address of the catalyst switch does not change when it fails over to the redundant PHY connection. In order to accomplish this, the ATM switch ports, to which the catalyst is attached, must be specially configured. Specifically, the NSAP prefix configured for the catalyst's secondary PHY must match the NSAP prefix configured for the catalyst's primary PHY.

In accordance with a preferred embodiment of the invention, the interface routers 49*a*, 49*b*, of FIG. 3, employ the redundancy protocol HSRP. The standby priority on each sub-interface is preferably set to ensure that only half of the sub-interfaces on each router 49*a*, 49*b* are active. The Spanning Tree Protocol performed on the catalyst switches may require that the active catalyst (e.g., catalyst switch 42*b*) for a given VLAN should be set to a priority of 100 to ensure it always becomes the root bridge for that VLAN. Additionally, the backup catalyst (e.g., catalyst switch 42*a*) should be set to a priority of 200 to ensure it always becomes the root bridge in the event of a failure of the active catalyst switch. The root bridge can be forced in any number of known ways such as using the "set spantree priority" command for each VLAN.

Figure 5:
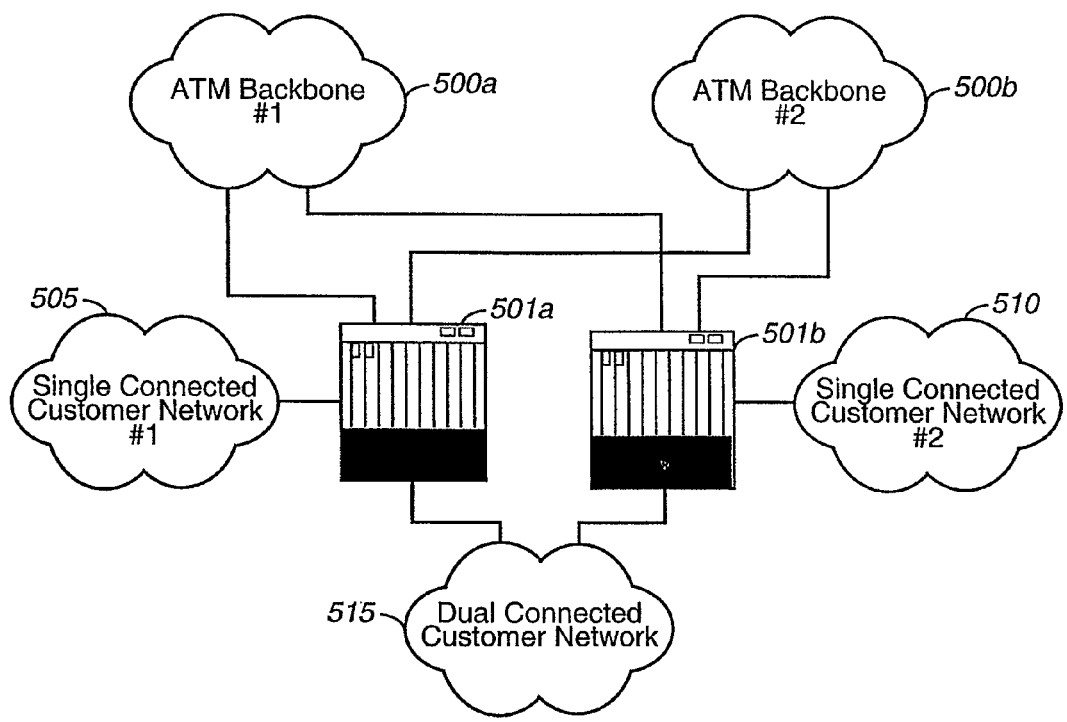
FIG. 5 illustrates multiple customer connections to the same routers and the potential problem which can exist due to load balanced transmissions.

With reference to FIG. 5, in accordance with the preferred embodiment of the invention, each customer network is attached to at least two different customer routers 501*a*, 501*b* for redundancy. One potential problem associated with this infrastructure is as information travels from, for example, customer network 505 to customer network 510, the information will be load balanced across all available paths. The load balancing will include the dual connected customer network 515. As is readily apparent, this practice would take away from the bandwidth available to customer network 515, and could potentially present security problems.

An acceptable method to avoid this problem is to adjust the EIGRP metrics to ensure that traffic between customer networks (e.g., 505 and 510) will be routed only through the backbone 500*a*, 500*b*. In accordance with the invention, the metrics can be properly adjusted by use of the "bandwidth" interface command on each customer ATM LANE sub-interface. After configuring the test environment in accordance with the discussion above, the following procedure may be implemented to test the resiliency of the network infrastructure in FIG. 3. Essentially, the resiliency is tested through systematically failing each portion of the test environment, particularly, by introducing various fault conditions. These fault conditions could be in the form of removed connections, disabled supervisor modules, power failures, or any other parameters needed to evaluate performance of a given infrastructure design. During this process, the client-server connection between the host center infrastructure and the BIPP 48 should be simulated. For example, a test signal (e.g., continuous signal) can be run from laptop 55 to one of the emulated customer server stations (e.g., SPARC station 40*a*). As each fault condition is introduced and corrected in the network, the time delay for the test signal to once again be received at the SPARC station 40*a* can be used to quantify the resiliency of the infrastructure. An exemplary testing procedure is provided below.

As a first step in the procedure, cable 7, connecting the hub 50 to the secondary catalyst 42*a* is removed. No down time should be experienced since cable 7 is not in the active path. Cable 7 is then reconnected to secondary catalyst 42*a*. Cable 6, connecting the hub 50 with the primary catalyst 42*b*, is then removed. A limited period of time (e.g., 45 seconds) will be needed for system recovery time to restore the signal to station 40*a*. Cable 6 is then restored to its original position. Next, the running supervisor module in the primary catalyst 42*b* is removed in order to test redundancy of the dual supervisor modules. A limited period of time for recovery (e.g., 2 minutes) should be allotted. The first supervisor module of the previous step is then restored. Next, the second supervisor module of catalyst 42*b* is removed to cause the original supervisor module to again become the running module. After recovery is made, the second supervisor module of catalyst 42*b* is then re-inserted.

The test method of the invention now turns to secondary catalyst 42*a*, where cable 5, the primary connection between catalyst switch 42*a* and ATM switch 46*b*, is removed. No downtime is experienced because cable 5 is not in the active path. Cable 5 is then restored to its original connection. Next, cable 3, the redundant connection between ATM switch 46*a* and the primary catalyst 42*b*, is removed. No downtime is experienced. Cable 3 is then restored to its original connection. Next, cable 4, the primary connection between ATM switch 46*b* and primary catalyst 42*b*, is removed. After recovery, cable 4 is then restored to its original position. Next, redundant cable 3 is again removed so as to cause the primary PHY ATM LANE module, within catalyst 42*b*, to again become active.

The next scheduled test parameter is a power failure of the secondary catalyst 42*a*. It should be noted, however, that no downtime is expected from such a power failure of catalyst 42*a*.

Next, a failure of one of the dual power supplies within primary catalyst 42*b* is introduced into the FIG. 3 test environment. No downtime is experienced since catalyst 42*b* continues to operate using only one power supply. Next, a failure of both power supplies within the primary catalyst 42*b* is introduced. A recovery time (e.g., 1 minute) is experienced while the Spanning Tree Protocol, routing, LECS, LES/BUS, and HSRP converge upon the secondary catalyst 42*a*. Next, the primary catalyst 42*b* is restored to full power and a small downtime (e.g., 53 seconds) may be experienced. It should be noted that the downtime period will not begin until after restoring power to catalyst 42*b*, when reconvergence of the Spanning Tree Protocol, routing, LECS, LES/BUS and HSRP to the primary catalyst 42*b* can be made.

Next, redundant power supply testing of ATM switches 46*a*, 46*b* is performed with no downtime period expected. Next, a complete power failure of secondary ATM switch 46*a* is introduced. No downtime should be experienced since switch 46*a* is not in the active path. Power is subsequently restored to ATM switch 46*a*.

Next, cable 1, connecting switch 46*a* to "backup" router 49*a* is removed. Because the backup router 49*a* is not in the active path, no downtime is expected. Cable 1 is then restored to its original position. Next, cable 2, connecting ATM switch 46*b* with active router 49*b*, is removed. A short recovery period (e.g., 12 seconds) is anticipated as recovery time. Cable 2 is then reconnected.

The next fault condition introduced in the procedure is the failure of the LES/BUS pair for the catalyst switches. First, the LES/BUS pair for secondary catalyst 42*a* is disabled; no downtime is expected. The LES/BUS pair for catalyst 42*a* is then re-enabled again without any experienced downtime. Next, the LES/BUS pair for the primary catalyst 42*b* is disabled, with a short recovery period (e.g., 35 seconds) expected. The recovery time in this instance is anticipated due to the fact that all LECs have to reconnect to the new LES/BUS pair, and the Spanning Tree Protocol, HSRP, and EIGRP must all converge onto the secondary catalyst 42*a*. The LES/BUS pair on the primary catalyst 42*b* is subsequently re-enabled, resulting in a short recovery period (e.g., 31 seconds) necessary for re-convergence upon primary catalyst 42*b*.

Next, the LECS for the secondary catalyst 42*a* is disabled resulting in no expected downtime because the "backup" LECS is not in the active path. The LECS for secondary catalyst 42*a* is then re-enabled without any downtime. Next, the LECS for primary catalyst 42*b* is disabled without any downtime being experienced. This is an expected response due to the fact that disabling the primary LECS will only prevent new LECs from joining ELANs. Finally, the LECS on the primary catalyst 42*b* are re-enabled without any downtime experienced. Similarly, this is expected since re-enabling the primary LECS will only allow new LECs to join ELANs.

It should be readily apparent that, although only two catalyst switches, two ATM switches and three routers were utilized in the foregoing environment for the sake of simplicity, any number of these or similar components may be used in a similar arrangement without departing from the spirit and scope of the test method of the invention.

In accordance with another embodiment of the invention, a method of adding a new customer connection to an existing infrastructure is discussed below.

Before the process of adding new customer connections can be performed, a number of configuration parameters must first be ascertained from the network devices that will accommodate a new customer connection. Although any number of parameters may be required depending on the infrastructure design, the most common parameters are illustrated herein. The first parameter to be identified is the customer's Internet Protocol (IP) prefix; specifically, the IP network number and mask to be used on this customer connection. The second parameter to be identified is the customer's unique connection number; a number used solely for internal network configuration purposes. Connection numbers are assigned sequentially and begin with the number two. The third parameter to be identified is the customer's ELAN name. Preferably, the name is composed of some number (e.g., 1 to 29) of ASCII characters which include the customer's name (e.g., "Acme 33" for the 33rd customer connection onto the infrastructure).

The fourth parameter to be identified is a unique VLAN number used to represent the catalyst VLAN assigned to the customer. The number is preferably consistent with the connection number (i.e., second parameter, above), however, if a conflict exists, any other unique number may be used. The fifth parameter to be identified is the customer's access control lists, to implement the customer's firewalling policies. The sixth parameter to be identified is the catalyst connection points. If the customer will be connected to two catalyst switches, a primary and a secondary switch must be identified. In addition, the exact switch ports to be used by that customer on each catalyst should be identified. It is advisable for each switch to service the same number of primary customer connections.

The last parameter to be identified is the router connection points; the routers and slots to be used for active and standby default gateways. It should be noted that the active router/slot combination is preferably attached to the same ATM switch as the active connection from the primary catalyst switch (i.e., from sixth parameter above). Similarly, the standby router/slot combination should be attached to the same ATM switch as the active connection from the secondary catalyst switch. As is true for the catalyst switch, new customer connections should preferably be balanced across available routers such that each router is servicing the same number of primary customer connections.

After identifying the configuration parameters needed, the procedure for adding a new customer connection can be commenced. The procedure initially requires creating a new VLAN for this new customer network on the primary catalyst switch. The appropriate ports to the newly created VLAN are then assigned. The root bridge for this VLAN must be set as the primary catalyst. The primary LES/BUS pair and a LEC on the ATM LANE module must then be configured.

Next, a determination needs to be made as to how many catalyst switches the customer will be connected. If the customer will be connected to two catalyst switches, a new VLAN for this customer network must be created on the secondary catalyst switch. The appropriate ports to the newly created VLAN are then assigned. It must then be ensured that this secondary catalyst will become the root bridge for this VLAN if the primary catalyst fails. The secondary LES/BUS pair and a LEC on the ATM LANE module are then configured. If the customer will be connected to only one catalyst switch, a connection is made to the catalyst switch which will act as a secondary LES/BUS pair for this customer. Since this customer will be connecting to only one catalyst switch, there is no need to configure a VLAN or a port. However, the secondary LES/BUS pair on the ATM LANE module of the secondary catalyst switch should be configured since the secondary catalyst switch will act as a backup LES/BUS pair. The connection to the ATM LANE module of the catalyst switch which is acting as the primary LECS is then made. Therefore, an entry needs to be created in the LECS database for the new ELAN.

Whether or not a single or dual connection is made to the catalyst switch, the procedure then requires that a connection be made to the ATM LANE module of the catalyst switch which is acting as the secondary LECS. Connection is then made to the router which will serve as this customer's active router by configuring a named IP extended access list. The ATM sub-interface on the active router must then be configured. The EIGRP should then be configured for the new customer on the active router.

Connection is then made to the standby router. This requires the configuring of a named IP extended access-list which is exactly the same as the list created in step fourteen. Next, the ATM sub-interface for the standby router is configured.

The EIGRP for the standby router is then configured. While the invention has been described in detail in connection with the best mode of the invention currently known, it should be readily understood that the invention is not limited to the specified embodiments described herein. Rather, the invention can be modified to incorporate any number of variations, alterations, substitutions or equivalent arrangements not heretofore described, which are commensurate with the spirit and scope of the invention. For example, only two routers, two ATM switches, and two catalyst switches were shown in the FIG. 1a hosting center 210 for simplicity of discussion. It should be readily apparent that any number of routers, ATM switches and catalyst switches may be used as necessary to meet customer requirements. Although specific commercially available components used to practice the invention have been identified, such as the Cisco Catalyst 5X00, FORE Systems ASX-200BX, and the Cisco 75X0, substitution of one or more other make or model components that satisfy the minimum structural and/or functional aspects of the invention as set forth herein is contemplated for use in practicing the invention.

In addition, similarly to the test environment, of FIG. 3, the LANE services operating on the catalyst switches 16a, 16b (of FIG. 1a) may instead be run in part or whole on the ATM switches, routers, or even a stand-alone device such as an off-the-shelf version of the commercially available ASN 9000 by FORE Systems. The LANE services may be employed utilizing the off-the-shelf version of the Distributed LAN Emulation (DLE) software commercially available and known as "ForeThought 5.0" by FORE Systems.

Accordingly, the invention is not limited by the foregoing description, but is only limited by the scope of the appended claims.

What is claimed as new and desired to be protected by Letters Patent of the United States is:

1. A method, comprising:
   simulating, by a computer device, load demands within a test environment including a subnetwork level that includes a plurality of customer networks coupled to a main network level,
   where simulating the load demands include establishing a plurality of Emulated Local Area Networks (ELANs) coupled, respectively, with a plurality of LAN Emulation clients, each of the plurality of ELANs being associated with an address;
   transmitting, by the computer device and from a first location within the test environment, a test signal, where the test signal is received, after a time delay, at a second location within the test environment;

introducing, by the computer device, fault conditions into the test environment, the introduced fault conditions occurring one at a time, where an occurring fault condition, of the fault conditions, is corrected before a next fault condition, of the fault conditions, is introduced into the test environment;

measuring, by the computer device, a first change to the time delay, the first change occurring in response to introducing the occurring fault condition into the test environment; and measuring, by the computer device, a second effect on the time delay, the second effect occurring after correcting the occurring fault condition before introducing the next fault condition.

2. The method of claim 1, where the plurality of customer networks includes a plurality of single connected customer networks and a plurality of double connected customer networks, and where the main network level corresponds to an Internet.

3. The method of claim 1, where transmitting the test signal includes:

transmitting the test signal between a first customer network and a second customer network, of the plurality of customer networks, where the test signal is transmitted via the main network level and not via a third customer network of the plurality of customer networks.

4. The method of claim 3, where the computer device is coupled to a primary ATM switch via a border router, and where, a switch bridges a backbone ELAN and an ethernet port of the border router.

5. The method of claim 1, where the subnetwork level provides redundancy at a physical interface layer, a data link layer, and a network layer.

6. A device, comprising:

a memory to store instructions, and a processor to execute the instructions to:

simulate load demands within a test environment including a subnetwork level that includes a plurality of customer networks coupled to a main network level, where simulating the load demands includes establishing a plurality of Emulated Local Area Networks (ELANs) coupled, respectively, with a plurality of LAN Emulation clients, each of the plurality of ELANs being associated with an address, transmit, from a first location within the test environment, a test signal, where the test signal is received, after a time delay, at a second location within the test environment, introduce a first fault condition and a second fault condition into the test environment, where the first fault condition is corrected before introducing the second fault condition, measure the time delay after introducing the first fault condition into the test environment and before correcting the first fault condition, and measure the time delay after correcting the first fault condition and before introducing the second fault condition.

7. The device of claim 6, where the test environment includes a hosting network level to couple the subnetwork level to the main network level, the hosting network level including a catalyst switch level that includes a plurality of catalyst switches coupled to an asynchronous transfer mode (ATM) switch level, where the ATM switch level includes a plurality of ATM switches coupled to a border router level, the border router level comprising a plurality of border routers coupled to an internal backbone level associated with the main network level.

8. The device of claim 7, where the plurality of catalyst switches includes a first catalyst switch and a second catalyst switch that are mutually redundant, where, when one of the first catalyst switch or the second catalyst switch fails when transporting the test signal, the other one of the one of the first catalyst switch or the second catalyst switch transports the test signal.

9. The device of claim 7, where the plurality of ATM switches includes a first ATM switch and a secondary ATM switch that are mutually redundant, where, when one of the first ATM switch or the second ATM switch fails when transporting the test signal, the other one of the first ATM switch or the second ATM switch transports the test signal.

10. The device of claim 7, where the plurality of border routers includes at least a first router and a second router that are mutually redundant, where, when one of the first router or the second router fails when transporting the test signal, the other one of the router or the second router transports the test signal.

11. The device of claim 7, where the plurality of border routers employ Hot Standby Routing Protocol (HSRP).

12. The device of claim 7, where the internal backbone level includes:

Internet Protocol (IP) subnetworks, where the IP subnetworks includes fully meshed ATM permanent virtual circuits (PVCs).

13. The device of claim 7, where each of the plurality of ELANs is coupled to ethernet ports of each of the plurality of catalyst switches.

14. The device of claim 13, where at least one of the plurality of ELANs is coupled, via an ethernet hub, to the ethernet ports of at least two of the plurality of catalyst switches.

15. The device of claim 7, where the test environment further includes:

a plurality of permanent virtual circuits (PVCs) that define dedicated logical transmission paths from hosting routers of the hosting network level to Internet routers, of the internal backbone level, through at least one of the plurality of ATM switches, and where, only a single routing hop is performed when transporting information signals between one of the Internet routers at an external access point associated with the internal backbone level and one of the hosting routers, of the hosting network level.

16. A non-transitory computer readable medium to store instructions that are executable by a processor of a computing device, the instructions comprising:

one or more instructions to simulate load demands within a test environment including a subnetwork level that includes a plurality of customer networks coupled to a main network level, where simulating the load demands include establishing a plurality of Emulated Local Area Networks (ELANs) coupled, respectively, with a plurality of LAN Emulation clients, each of the plurality of ELANs being associated with an address;

one or more instructions to transmit, from a first location within the test environment, a test signal, where the test signal is received, after a time delay, at a second location within the test environment;

one or more instructions to introduce a series of fault conditions into the test environment, where a first fault condition, of the series of fault conditions, is corrected before introducing a subsequent second fault condition, in the series of fault conditions; and one or more instructions to compare a first effect, on the time delay, to a second effect, one the time delay, where the first effect, to the time delay, is in response to introducing the first fault condition into the test environment, the first effect being measured before correcting the first fault condition, where the second effect, to the time delay, is in response to correcting the first fault condition, the second effect being measured before introducing the second fault condition.

17. The non-transitory computer readable medium of claim 16, where the series of fault conditions comprises two or more of:

a removal of an interface, a removal of a supervisor module within a device, a disabling of a Local Area Network Emulation Server/Broadcast and Unknown Server (LES/BUS) pair, a disabling of a Local Area Network Emulation Configuration Server (LECS) of a device, and a total power failure of a device within the test environment, or a partial power failure of a device within the test environment, and where the test environment includes a hosting network level that couples the subnetwork level to the main network level.

18. The non-transitory computer readable medium of claim 17, where the series of fault conditions comprises the removal of the interface, and where the removed interface couples an ethernet hub of the subnetwork level to a primary catalyst switch of the hosting network level.

19. The non-transitory computer readable medium of claim 17, where the series of fault conditions comprises the removal of the interface, and where the removed interface couples a secondary catalyst switch of the hosting network level to a primary ATM switch of the hosting network level.

20. The non-transitory computer readable medium of claim 17, where the series of fault conditions comprises the removal of an interface, and where the removed interface couples a primary catalyst switch of the hosting network level to a secondary asynchronous transfer mode (ATM) switch of the hosting network level.

21. The non-transitory computer readable medium of claim 17, where the series of fault conditions comprises the removal of the interface, and where the removed interface couples a primary catalyst switch of the hosting network level to a primary asynchronous transfer mode (ATM) switch of the hosting network level.

22. The non-transitory computer readable medium of claim 17, where the series of fault conditions comprises the removal of the interface, and where the removed interface couples a secondary asynchronous transfer mode (ATM) switch of the hosting network level to a secondary border router of the hosting network level.

23. The non-transitory computer readable medium of claim 17, where the series of fault conditions comprises the removal of the interface, and where the removed interface couples a primary asynchronous transfer mode (ATM) switch of the hosting network level to a primary border router of the hosting network level.

24. The non-transitory computer readable medium of claim 17, where the series of fault conditions comprises the removal of the supervisor module, and where the device, in which the supervisor module is removed, is one of a plurality of catalyst switches included in the hosting network level, where the plurality of catalyst switches are mutual redundant.

25. The non-transitory computer readable medium of claim 17, where the series of fault conditions comprises the total power failure associated with the device, where the device includes a catalyst switch included in the hosting network level, and where the total power failure occurs within the catalyst switch.

26. The non-transitory computer readable medium of claim 17, where the series of fault conditions comprises the disabling of the LES/BUS pair, and where the disabling of the LES/BUS pair occurs within a catalyst switch of the hosting network level.

27. The non-transitory computer readable medium of claim 17, where the series of fault conditions comprises the disabling of the LECS of the device, and where the device includes a catalyst switch included in the hosting network level, and where the disabling of the LECS occurs within the catalyst switch.

* * * * *